United States Patent
Conway (10) Patent No.: US 7,376,132 B2
(45) Date of Patent: May 20, 2008

(54) PASSIVE SYSTEM AND METHOD FOR MEASURING AND MONITORING THE QUALITY OF SERVICE IN A COMMUNICATIONS NETWORK

(75) Inventor: Adrian E. Conway, Weston, MA (US)

(73) Assignees: Verizon Laboratories Inc., Waltham, MA (US); Level 3 Communications, LLC, Broomfield, CA (US)

( * ) Notice: Subject to any disclaimer, the term of this patent is extended or adjusted under 35 U.S.C. 154(b) by 954 days.

(21) Appl. No.: 10/639,395

(22) Filed: Aug. 12, 2003

(65) Prior Publication Data

US 2004/0034492 A1  Feb. 19, 2004

Related U.S. Application Data

(63) Continuation-in-part of application No. 09/822,043, filed on Mar. 30, 2001, now Pat. No. 7,099,281.

(60) Provisional application No. 60/403,412, filed on Aug. 14, 2002, provisional application No. 60/413,329, filed on Sep. 25, 2002.

(51) Int. Cl.
*H04L 1/20* (2006.01)
*H04L 12/26* (2006.01)

(52) U.S. Cl. ............. 370/389; 370/252; 370/352; 370/401

(58) Field of Classification Search ........ 370/230–235, 370/352–360, 395–465; 709/224–228, 249–250; 704/226–236
See application file for complete search history.

(56) References Cited

U.S. PATENT DOCUMENTS

| | | | |
|---|---|---|---|
| 5,127,001 A | | 6/1992 | Steagall et al. |
| 5,343,463 A | * | 8/1994 | van Tetering et al. ...... 370/253 |
| 6,147,998 A | * | 11/2000 | Kelley et al. ............ 370/395.1 |
| 6,360,271 B1 | | 3/2002 | Schuster et al. |
| 6,363,053 B1 | * | 3/2002 | Schuster et al. ............ 370/230 |
| 6,477,492 B1 | | 11/2002 | Connor |

(Continued)

OTHER PUBLICATIONS

L. Sun, and E.C. Ifeachor, "Perceived Speech Quality Prediction For Voice Over IP-Based Networks," *IEEE International Conference on Communications (ICC 2002)*, vol. 4, pp. 2573-2577, 2002.

(Continued)

*Primary Examiner*—M. Phan (57) ABSTRACT

In accordance with the present invention, a portion of a received media stream is copied from a data network without interfering with the flow of the data in the network. A known test signal is then substituted for the information contained in the copied portion of the media stream to prepare a pseudo-media stream. The known test signal is encoded, and packetized if necessary, using the same methods used for the received media stream. A pseudo-media signal is then recovered from the pseudo-media stream using the same depacketizing and decoding methods to be used on the received media stream. The recovered signal is an accurate representation of the state of the received media stream since it has gone through the same packetization/depacketization and encoding/decoding procedures, and it includes all of the same faults of the copied media stream. The perceptual quality of the recovered signal is then measured, providing an accurate measure of the perceptual quality of the copied media stream. The method may be applied to packetized as well as non-packetized voice signals.

36 Claims, 7 Drawing Sheets

U.S. PATENT DOCUMENTS

| | | | |
|---|---|---|---|
| 6,512,746 | B1 | 1/2003 | Sand |
| 6,577,996 | B1* | 6/2003 | Jagadeesan ................. 704/236 |
| 6,609,092 | B1* | 8/2003 | Ghitza et al. ............... 704/226 |
| 6,700,953 | B1 | 3/2004 | Maurer et al. |
| 6,738,353 | B2* | 5/2004 | Chong ........................ 370/241 |
| 6,741,569 | B1 | 5/2004 | Clark |
| 6,965,597 | B1* | 11/2005 | Conway ...................... 370/389 |
| 7,062,264 | B2* | 6/2006 | Ko et al. .................... 455/423 |
| 7,099,281 | B1* | 8/2006 | Conway ...................... 370/252 |
| 7,218,895 | B1* | 5/2007 | Raghavan ................ 455/67.13 |
| 2002/0193999 | A1* | 12/2002 | Keane et al. ................ 704/270 |
| 2003/0093513 | A1* | 5/2003 | Hicks et al. ................ 709/224 |
| 2006/0029067 | A1* | 2/2006 | Conway ...................... 370/389 |

OTHER PUBLICATIONS

A.D. Clark, "Modeling The Effects Of Burst Packet Loss And Recency On Subjective Voice Quality," *2nd IP-Telephony Workshop,* Columbia University, New York, Apr. 2001.

P. Gray, M.P. Hollier, and R.E. Massara, "Non-Intrusive Speech-Quality Assessment Using Vocal-Tract Models," *IEE Proceedings—Vision, Image and Signal Processing,* vol. 147, No. 6, pp. 493-501, Dec. 2000.

S. Mohamed, F. Cervantes-Perez, and H. Afifi, "Audio Quality Assessment In Packet Networks: An "Inter-Subjective" Neural Network Model," *15th International Conference on Information Networking,* pp. 579-586, 2001.

In W. Jiang, and H. Schulzrinne, "Speech Recognition Performance As An Effective Perceived Quality Predictor," *10th IEEE International Workshop on Quality of Service,* pp. 269-275, 2002.

"3SQM™ Advanced Non-Intrusive Voice Quality Testing," *White Paper,* Opticom GmbH, Germany, 2003.

C. Michael Chernick, Stefan Leigh, Kevin L. Mills, and Robert Toense, "Testing the Ability of Speech Recognizers to Measure the Effectiveness of Encoding Algorithms for Digital Speech Transmission," *National Institute of Standards and Technology,* pp. 1468-1472, Jan. 1999.

A. Bayya and M. Vis, "Objective Measures for Speech Quality Assessment in Wireless Communications," *U.S. West Advanced Technologies,* Boulder, CO, pp. 495-498, 1996.

J. Liang and R. Kubichek, "Output-Based Objective Speech Quality," Electrical Engineering Department, University of Wyoming, Laramie, WY, pp. 1719-1723, 1994.

C. Jin and R. Kubichek "Output-Based Objective Speech Quality Using Vector Quantization Techniques," University of Wyoming, Electrical Engineering Department, Laramie, NY, pp. 1291-1294, 1996.

S. Jeerage and R. Kubichek, "Perceptually-Based Objective Quality Using Phoneme-Level Segmentation," Electrical Engineering Department, University of Wyoming, Laramie, WY, pp. 1301-1305, 1994.

* cited by examiner

PASSIVE SYSTEM AND METHOD FOR MEASURING AND MONITORING THE QUALITY OF SERVICE IN A COMMUNICATIONS NETWORK

CROSS REFERENCE To RELATED APPLICATIONS

This application claims priority under 35 U.S.C. §120 to and is a continuation-in-part of U.S. application Ser. No. 09/822,043 filed Mar. 30, 2001, now U.S. Pat. No. 7,099,281, issued Aug. 29, 2006, which is hereby incorporated by reference in its entirety into this patent application. This application also claims priority under 35 U.S.C. § 119(e) to U.S. Provisional Application No. 60/403,412, filed Aug. 14, 2002, and to U.S. Provisional Application No. 60/413,329, filed Sep. 25, 2002, both of which are also incorporated by reference into this patent application in their entirety.

BACKGROUND OF THE INVENTION

1. Field of the Invention

The present invention relates to systems and methods for measuring the quality of service in a communications network, and, more particularly, the perceptual quality of digitally encoded signals in a communications network, without interrupting the flow of the data streams carrying the digitally encoded signals or injecting a known test signal into the communications network.

2. Description of the Related Art

In the measurement and monitoring of voice call quality, one may apply active or passive methods. An active (or intrusive) method is one that transmits test signals through the network to make measurements. A passive (or non-intrusive) method operates on the existing voice calls without adding measurement traffic to the network. Several passive (or non-intrusive) methods and related methods have already been developed or proposed for measuring or monitoring voice call quality and audio signal quality. In L. Sun, and E.C. Ifeachor, "Perceived Speech Quality Prediction For Voice Over IP-Based Networks," *IEEE International Conference on Communications* (ICC 2002), Vol. 4, pp. 2573-2577, 2002, for example, an artificial neural network model is developed and proposed for the non-intrusive monitoring of voice-over-IP (VoIP) calls. In A. D. Clark, "Modeling The Effects Of Burst Packet Loss And Recency On Subjective Voice Quality," 2nd IP-Telephony Workshop, Columbia University, New York, April 2001, a method called "Vqmon" is developed for estimating the transmission quality of VoIP calls. The method is intended for the non-intrusive real-time passive monitoring of VoIP calls. It uses an extended version of the ITU G.107 E-model. VQmon is offered as a commercial product by Telchemy, Inc. (see www.telchemy.com).

In P. Gray, M. P. Hollier, and R. E. Massara, "Non-Intrusive Speech-Quality Assessment Using Vocal-Tract Models," *IEE Proceedings—Vision, Image and Signal Processing*, vol. 147, No. 6, pp. 493-501, December 2000, an automatic speech recognition (ASR) system is used to evaluate VoIP speech quality for the G.723 and G.729 codecs. Results are presented for the 'recognition accuracy' as a function of various packet loss rates and packet sizes. In S. Mohamed, F. Cervantes-Perez, and H. Afifi, "Audio Quality Assessment In Packet Networks: An 'Inter-Subjective' Neural Network Model," *15th International Conference on Information Networking*, pp. 579-586, 2001, a neural network model approach is developed for audio signals. In W. Jiang, and H. Schulzrinne, "Speech Recognition Performance As An Effective Perceived Quality Predictor," *10th IEEE International Workshop on Quality of Service*, pp. 269-275, 2002, a mean-opinion-score (MOS) estimation method is developed based on machine speech recognition. In "3SQM™ Advanced Non-Intrusive Voice Quality Testing," White Paper, Opticom GmbH, Germany, 2003, a new non-intrusive method is proposed.

In recent years, packet-switching networks have been used increasingly for transport of real-time media signals, such as, for example, digitally-encoded voice and video signals, that are transmitted either in real-time or in some kind of delayed fashion. A specific example is the increasing use of the Internet for carrying voice-over-internet protocol (VoIP) calls. In a VoIP call, a digitally encoded voice signal is packetized and incorporated into an Internet Protocol (IP) packet stream, which is then transmitted over the Internet to a destination device. At the destination device, the digitally encoded voice signal is extracted from VoIP packet payloads in the packet stream and then decoded into a signal that is played-out in real-time to the user at the destination device.

When a packetized real-time media stream is transmitted across a packet-switching network, the packet stream may be corrupted by a number of network impairments. Examples of network impairments include packet-discarding at routers due to packet bit errors, packet-dropping at interface buffers due to traffic congestion, packet-duplication, time delays beyond a predetermined hard or soft real-time deadline, packet-misrouting and loss of packet-sequence. These impairments generally degrade the quality of the media signal that is eventually received at the destination.

Due to network impairments that may be encountered in the transmission of real-time media over a packet-switching network, it is important to be able to measure and monitor the quality-of-service (QoS) that is being provided by the network. Typical network QoS measures include, for example, end-to-end packet delay, end-to-end packet delay jitter, packet corruption, and packet loss. To monitor such network QoS measures, one can deploy commercially available monitoring systems.

Although monitoring and measuring the QoS in a network provides valuable information regarding the ability of a network to properly support real-time media signal transmissions, such measures do not directly reflect the perceptual (subjective) quality of the media signal as it is actually perceived by an end-user. This is the case because the perceptual quality of a real-time media signal, as perceived by the end-user, is difficult to quantify in terms of the network QoS measures.

To deal with this general problem, objective methods have been developed for estimating perceptual quality of media signals. For example, perceptual speech quality measurement ("PSQM") is a means for objectively assessing the quality of speech that has been degraded by a telephony network. It has a high correlation to perceptual quality across a range of distortion types, and is used to test networks that are subject to different coding types and transmission errors. PSQM is used primarily to test networks that have speech compression, digital speech interpolation, and packetization. PSQM of this type has been recommended by the International Telecommunication Union-Telecommunications Standardization Sector ("ITU-T") Recommendation P.861. Another example of an objective method for voice signals is ITU-T Recommendation P.862 (PESQ).

Figure 1:
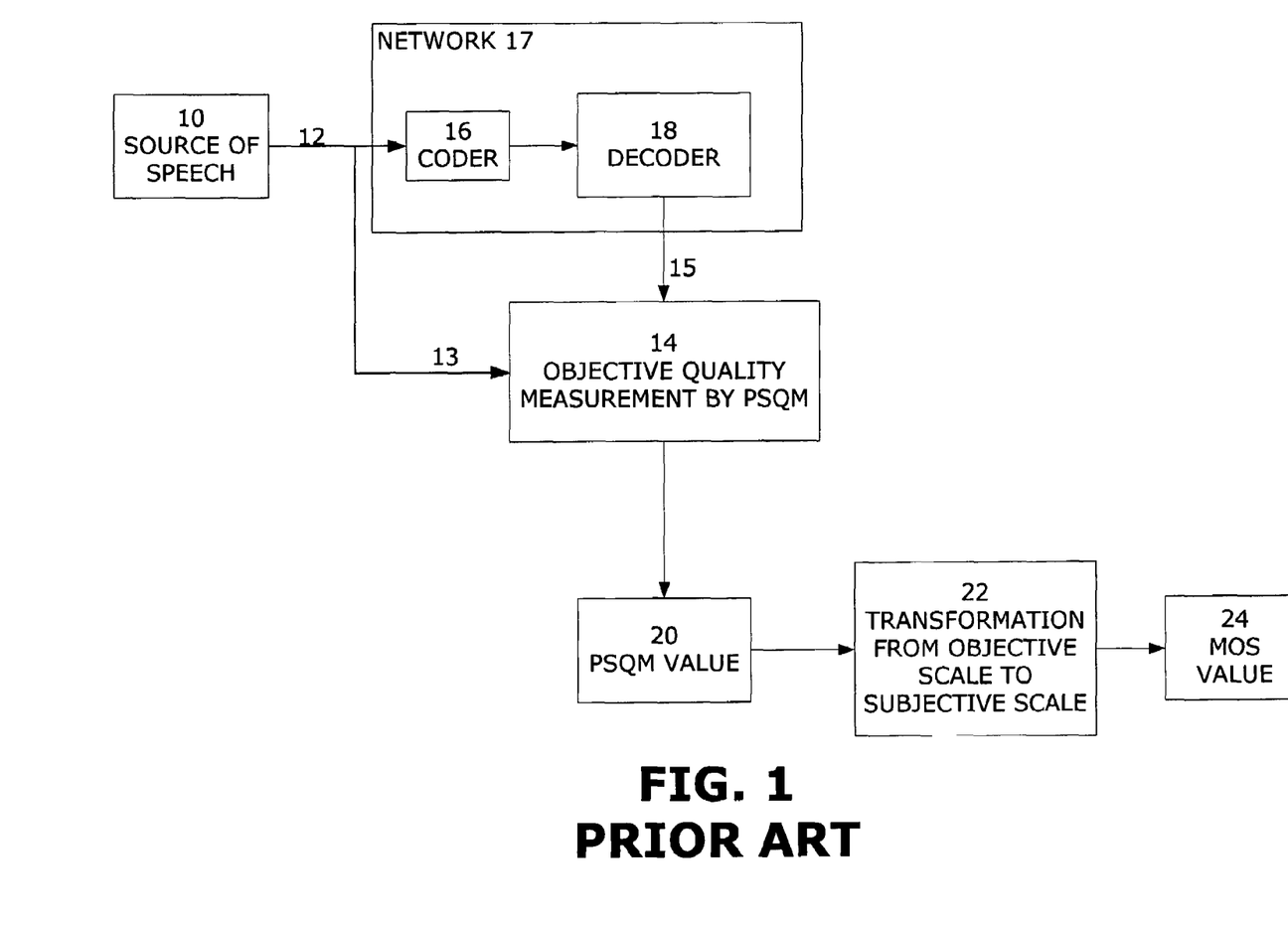
FIG. 1 depicts the prior art PSQM algorithm for measuring the objective quality of a speech signal in a packet-switching network.

FIG. 1 depicts the basic approach of PSQM that has been adopted by some organizations to estimate the perceptual quality of a VoIP call that traverses a packet-switching network. In an objective method, a source of speech 10, generates a known signal 12, which is then transmitted across the network 17. The known signal 12 may be a pre-recorded natural voice signal, or a specialized test signal, such as the Artificial Speech-like Test Stimulus (ASTS™) or ITU-T Recommendation P. 50. The known signal for use in PSQM may be stored in a commonly used file format such as, for example, a wave (.WAV) file. The process of transmitting a known signal to evaluate the degradation in quality after it has traversed the network may be termed an active method because the known test signal is actually injected into and transmitted across the network.

PSQM uses a psychoacoustic model 14, which aims to mimic the perception of speech in real life, and was originally developed to test compressor/decompressors (codecs). A codec, which typically comprises a software-, hardware- or firmware- based algorithm, translates speech, video or audio signals between their uncompressed form and the compressed forms in which they are typically transmitted. The algorithm functions by comparing the quality of signal 12 before it has been transmitted across the network 17 to the quality of signal 12 after it has been transmitted across the network 17 (i.e., comparing input signal 13 to input signal 15).

PSQM provides an output 20 in the range of 0 to 6.5, where values close to 0 indicate very good speech quality, and values close to 6.5 indicate poor speech quality. At the destination, a quality measure or score (e.g. mean opinion score (MOS)) is computed 22 based on the received signal and the known artificial voice signal that was transmitted and is output 24. Although PSQM does not have a direct correlation to MOS, the perceptual quality is nevertheless inferred from the objective quality. That is, if a person listens to a speech sample that has a PSQM value of 2, that person would think the quality was worse than a speech sample having a PSQM value of 1. PSQM values can be roughly translated into MOS values.

Accordingly, there is a need for an accurate perceptual measurement system for determining the mean opinion score and quality of packet media streams in a packet-switched network and framed encoded media (e.g., voice, video and audio) signals in a non-packetized (or circuit switched) communications network. There is a further need for a passive (non-intrusive) objective perceptual measurement system that utilizes objective measurement tools. There is still a further need for a perceptual quality measurement system that does not depend on whether the signal being measured is packetized or not.

SUMMARY OF THE INVENTION

This invention provides a system and method for the non-intrusive determination of the perceptual quality of a packetized and non-packetized real-time media data stream in a communications network using a computational algorithm to provide an objective measure of perceptual quality. It also provides for the perceptual determination of the quality of the media data stream without interrupting the flow of the media stream. Moreover, the invention allows for the perceptual quality determination of the media stream without the addition of a known test signal into the communications network. Passive perceptual quality determination of the media stream using this method prevents perturbing the packets (if it is a packet-switching network) in the media stream, thereby increasing the strength and accuracy of the perceptual results.

A media stream to be measured is transported using packets containing a timestamp, a sequence number, and a source identifier. The type of encoding and packetization method may be known from knowledge that one may have about the media stream being measured or it may be known explicitly from information contained in the media packet headers. For example, in the case of real-time transfer protocol (RTP) packets, the header typically contains a 7-bit payload type field that identifies the format of the RTP payload and determines how it should be interpreted.

In general, the present invention operates in a packet-switched network as follows. First, packets are copied from a network with their associated timestamps and stored in a memory without interfering with the flow of data in the network. The timestamps of the packets are the local time at which the packet is copied, and ensures that temporal correlation can be performed between the original packets and the copied packets. Copied packets are separated into individual streams of packets utilizing the source identifier field in each packet header. The media signal in an individual copied packetized stream is replaced with a known test signal forming a pseudo-media stream. The same methods are used to encode, packetize, depacketize and decode the known test signal as those used on the copied media stream signal. The pseudo-media stream therefore contains all of the faults of the copied signal including any faults incurred in the copied signal during its transmission. The perceptual quality of the pseudo-media stream is then measured, disclosing the subjective quality of the data signal. These and other advantages of this invention are described in or are apparent from the following detailed description of the preferred embodiments.

As will be described below, the present invention operates in a similar manner for a non-packetized communication network. In a non-packetized communication network, however, there is no need to perform the packetizing and depacketizing steps.

In some embodiments, it also may be desirable or necessary to shift the quality measurement computations away from the destination device where the measurements are taken to a remote server in order to take advantage of higher levels of computational power available on the remote server. In some embodiments, the present invention makes direct use of existing active methods of objective perceptual quality measurement, such as the ITU-T P.862 PESQ, as described in ITU-T Recommendation P.862, Perceptual Evaluation Of Speech Quality (PESQ), An Objective Method For End-To-End Speech Quality Assessment Of Narrowband Telephone Networks And Speech Codecs, 2001.

DESCRIPTION OF THE PREFERRED EMBODIMENTS

Figure 2:
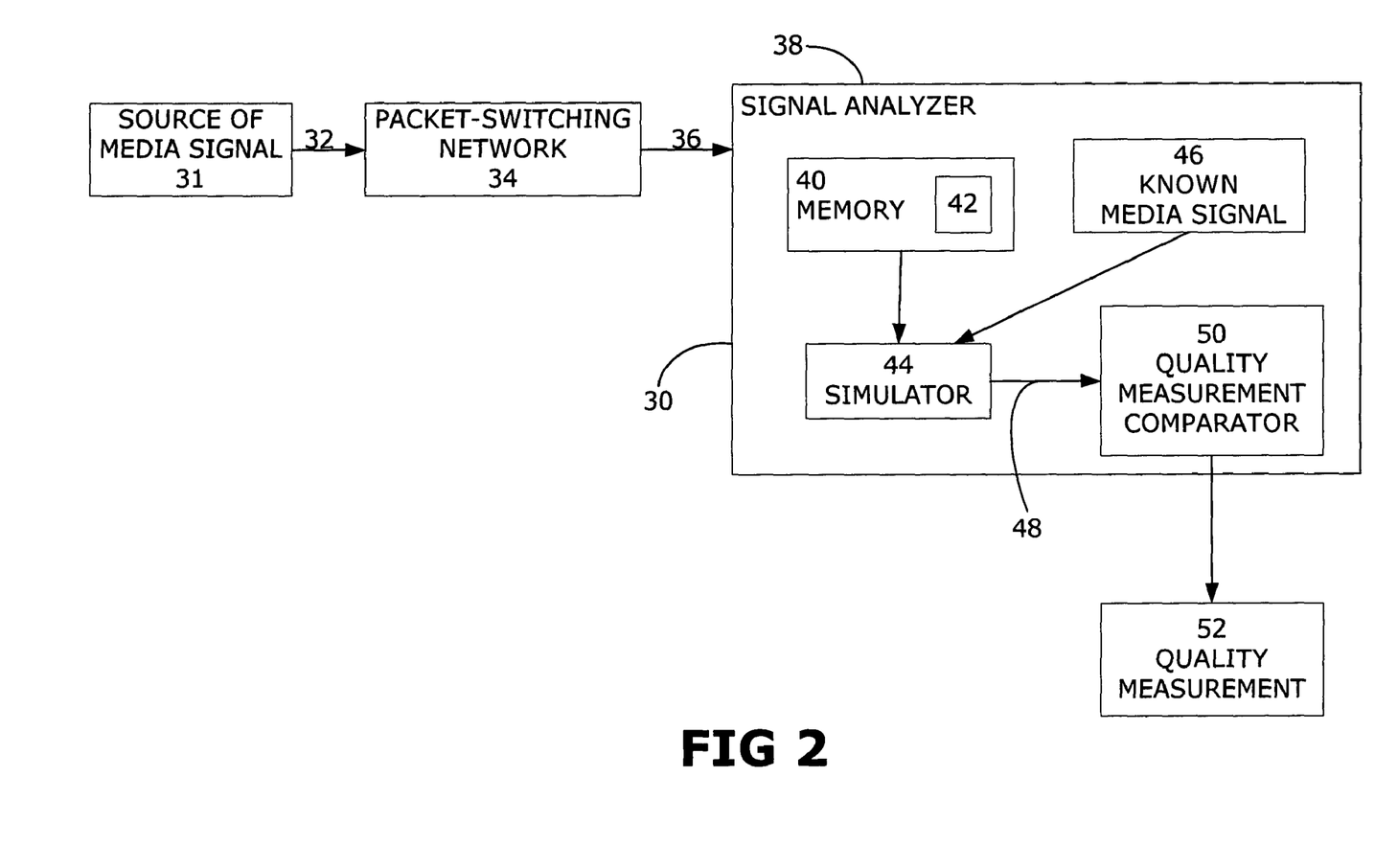
FIG. 2 shows the components of the passive system used to measure the perceptual quality of a media signal in a packet-switching network in accordance with an embodiment of the invention.

FIG. 2 depicts a passive system 30 for measuring perceptual quality of real-time media streams 32 in a packet-switching network 34. The real-time media streams 32 are obtained from a source 31 and can be in an analog or digital format. The real-time media streams 32 are digitally encoded and packetized to form a packet stream 36, which is transmitted over the packet-switching network 34. The packet stream 36 is copied from network 34 without interfering with the data stream carried by the network. For example, a packet stream 36 may be copied from any suitable port, not illustrated, for example, an Ethernet hub, a tap on a transmission link, or a packet-switch that is configured to operate as a switched port analyzer ("SPAN") port. A SPAN is a device that extends the monitoring abilities of existing network analyzers into a switched Ethernet environment. The SPAN mirrors the traffic at one switched segment of the network onto a predefined SPAN port. A signal analyzer 38 attached to the SPAN port can monitor traffic received from any other switched ports.

The copied portion of packet stream 36 is sent to a temporary memory 40 and marking unit 42, where each copied packet is given a timestamp corresponding to the current time at which it is copied.

Memory 40 is preferably implemented using static or dynamic random access memory (RAM). However, memory 40 can also be implemented using one or more of static RAM, dynamic RAM, read-only memory (ROM), flash memory, hard disk drive, compact disc read-only memory (CD-ROM) drive, compact disc-readable/writable (CDRW) drive, floppy disk drive, network servers or the like.

Copied packets from packet stream 36 are retrieved by a simulator 44, where they are separated from the multisource media stream according to information contained in each packet header portion. The encoding/decoding and packetization/depacketization methods used and to be used with the selected single source media stream are also determined by the simulator 44.

A known media signal 46 is sent to the simulator 44 where the known media signal 46 is encoded and packetized using the same encoding and packetization techniques used on the real-time media streams 32, and is substituted into the copied packets from packet stream 36, and output as pseudo-packets, or pseudo-media stream 48 to a quality measurement comparator 50.

Pseudo-media stream 48 contains the known media signal 46 and all the faults in the packet stream 36. Comparator 50 determines the perceptual quality of the pseudo-media stream 48, and outputs a quality measurement 52.

Figure 3:
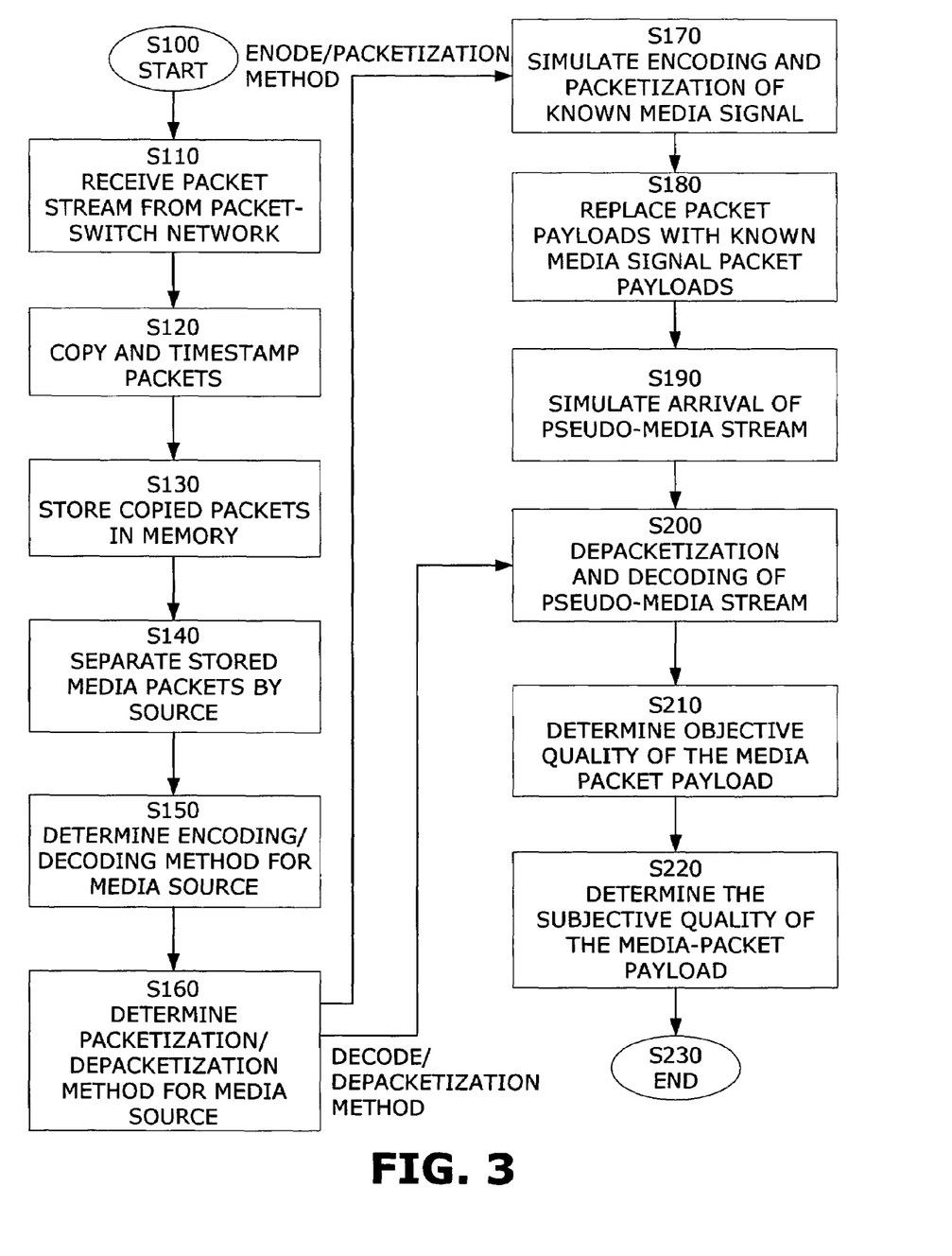
FIG. 3 depicts a flow chart showing the steps performed to determine the perceptual quality of a real-time media stream in a packet-switching network in accordance with an embodiment of the invention.

FIG. 3 depicts a flow chart of the steps to determine the quality of the media signal 32 arriving from source 31, starting at step S100, and continuing to step S230.

In step S10, packet stream 36 is received from packet-switching network 34, and continues to step S120. In step S120, packets in packet stream 36 are copied from packet-switching network 34 without interfering with the data stream carried by the network, and are timestamped. The process continues to step S130. The copied and timestamped packets are then stored in memory 40 at step S130.

Next, in step S140, the stored packets are separated by their media source, which are identified from source information contained in each packet header portion, and processing continues at step S150. In step S150, the encoding and decoding techniques used to encode and decode the packets in packet stream 36 are determined, and the process continues at step S160.

The techniques for packetization and depacketization of the packets in packet stream 36 are determined in step S160. The technique for encoding/packetization is output to step S170, and the technique for decoding/depacketization is output to step S200, and the process continues to step S170. A known media signal 46 is encoded and packetized in step S170 using the same techniques used in encoding and packetizing packet stream 36.

In step S180, the encoded and packetized known signal 46 proceeds to the simulator 44, where the payloads are emptied from each copied packet and a new payload is added corresponding to the encoded and packetized known media signal 46 to form psuedo-media stream 48. It should be noted that each loaded packet in pseudo-media stream 48 contains the same packet payload that would have been contained in packet stream 36 if packet stream 36 had actually carried the known media signal encoded and packetized. The pseudo-media stream 48 containing the known media signal 46 has all of the same faults as the copied media signals. For example, if packets from the copied media signal are missing for any reason or are out of sequence, the pseudo-media stream 46 will have the same faults.

Next, in step S190, arrival of the pseudo-media stream 48 is simulated, and processing continues at step S200. In step S200, the packets in psuedo-media stream 48 are decoded and depacketized, and processing continues to step S210.

In step S210, the objective quality of the decoded and depacketized pseudo-media stream 48 is determined, using, for example, PSQM, and processing continues to step S220. In step S220, the perceptual quality of the decoded and depacketized pseudo-media stream 48 is determined, for example, by comparing the decoded and depacketized pseudo-media stream 48 to the known signal before it was inserted into the packets in psuedo-media stream 48. The comparison provides a quality measurement score, and the process ends at step S230.

Figure 4:
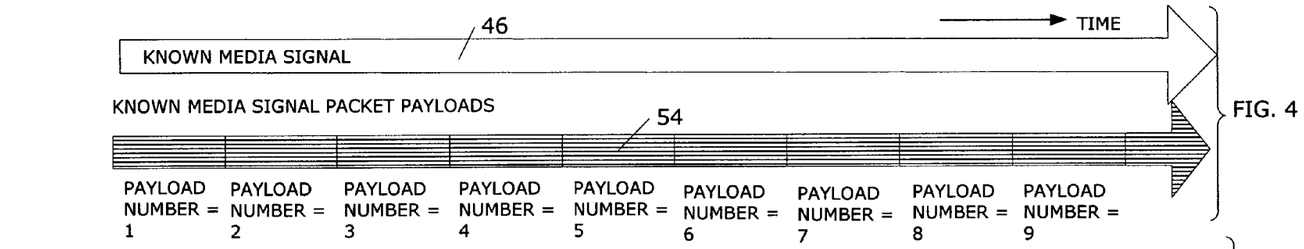
FIG. 4 depicts packets of a known signal having known packet payloads.
Figure 5:
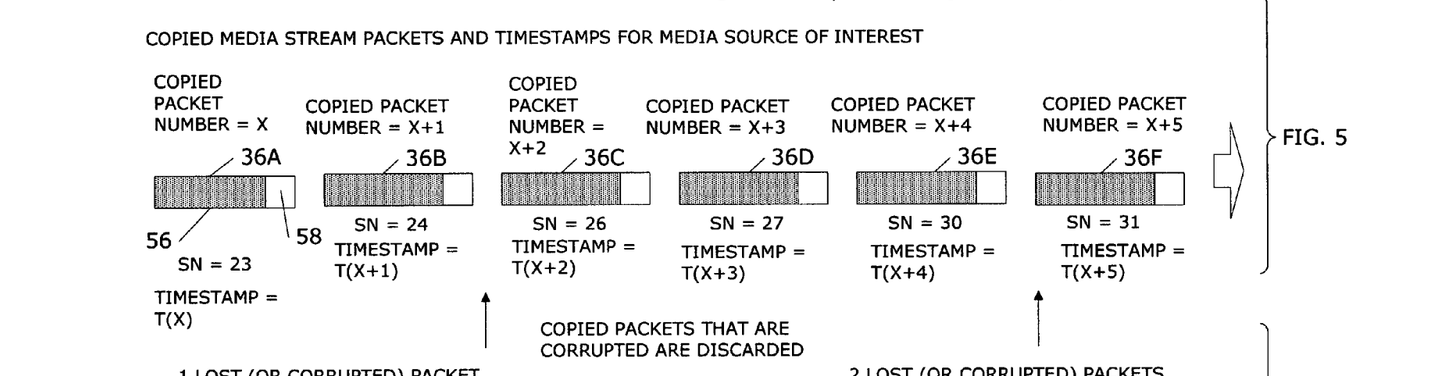
FIG. 5 depicts packets copied from a media stream of interest.
Figure 6:
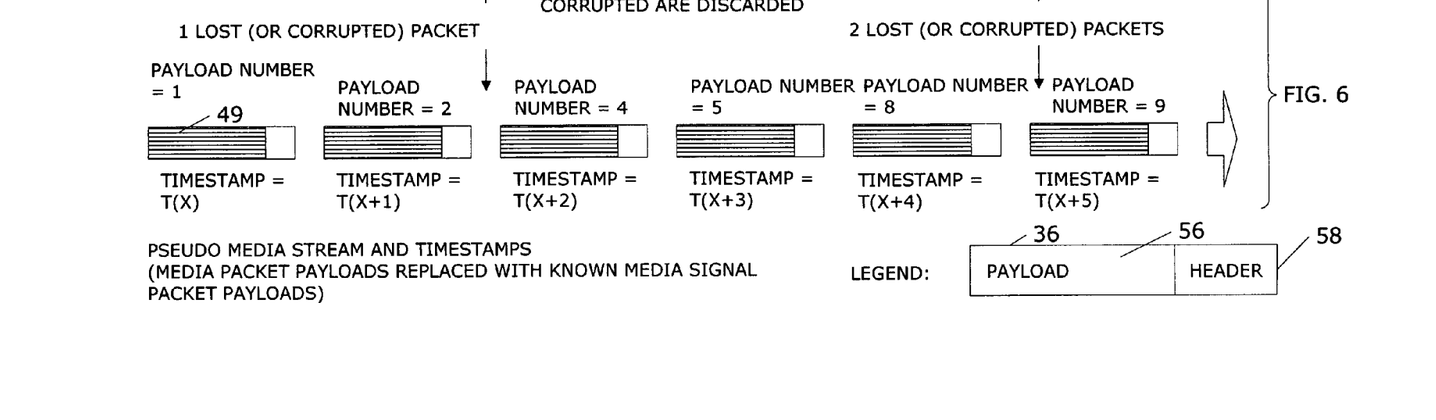
FIG. 6 depicts a pseudo packet media stream with the media packet payloads of interest replaced with known media packet payloads.

The substitution of a known signal into a packet is further illustrated in FIGS. 4-6, where a known media signal 46 is represented. The packets are, for example, real-time transport protocol (RTP) packets, defined in Request for Comments (RFC) 1889, which are commonly used to carry VoIP and other media. In an RTP packet, the header typically includes a 32-bit timestamp, a 16-bit sequence number, and a 32-bit Synchronization Source (SSRC) identifier. Known media signal 46 has been packetized in representation 54 using the same method as that used to packetize the packet media stream 36 under measurement.

In FIG. 5, it can be seen that each packet of the copied signal 36a, 36b, 36c, 36d, 36e and 36f is timestamped and identified by its sequence number ("SN") in the stream. Any corrupted packets are eliminated, as they would be at the receiving end in the packet-switching network 34. It should also be noted that there are gaps in the sequence numbers of the copied media stream. As previously mentioned, these gaps could result from many possible problems, including dropped and discarded packets, bit errors, duplicated packets and time delays.

Each copied packet 36a-36f has a payload portion 56 and a header portion 58 as shown in FIG. 5 and the legend of FIG. 6. The header portion 58 includes a timestamp, a sequence number and a source identifier. When replacing the copied media stream packet payloads 56, the sequence numbers are used to determine which known media signal packet payloads should replace the copied packet media stream packet payloads. The copied media stream packet payloads 56 of the packet media stream 36, which contain the encoded digital signal. The payloads 56 of each of the copied and timestamped packets 36a-36f are then emptied and the packets of the known signal 54 are added to the packets 36a-36f to create a pseudo-media stream 48 depicted in FIG. 6.

In FIG. 6, the timestamped pseudo-media stream 48 is shown complete with all the faults present in the copied packet media stream 36. Note that the packets identified by sequence number (SN) 25, 28 and 29 are missing. The pseudo-media stream 48 containing the packetized known test signal is an accurate representation of the copied packet media stream 36. Timestamping of each packet in packet stream 36 upon copying assures that the signal to be tested has the same temporal sequence of packet elements as the original source media stream 32.

A detailed description of an embodiment of the present invention configured to measure QoS at the frame level will now be presented. In this embodiment, a received voice signal is measured at the receiving end of a voice call, at a position just prior to the voice signal decoding, where the voice signal is a framed encoded digital signal. Although the invention is described in the context of monitoring voice-over-packet call quality, it will be apparent to one of ordinary skill in the art that the disclosed invention also may be beneficially applied to other digitally encoded framed signal types, such as audio or video by generalizing the steps discussed below. Thus, the alternative, more generalized approach falls within the scope of the invention.

It is also noted that the method is not restricted to using only objective quality measurement tools recommended by the ITU-T. Objective quality measurement tools recommended and/or standardized by other organizations, as well as proprietary objective quality measurement tools, may also be substituted and used, in accordance with the present invention, instead of the ITU-T objective quality measurement tools. Accordingly, it should be understood that, while the invention has broader, more general applications, it is presented below in terms of voice signals and ITU-T recommended objective quality measurement tools in order to simplify the presentation and illustrate one significant application for the invention.

Figure 7:
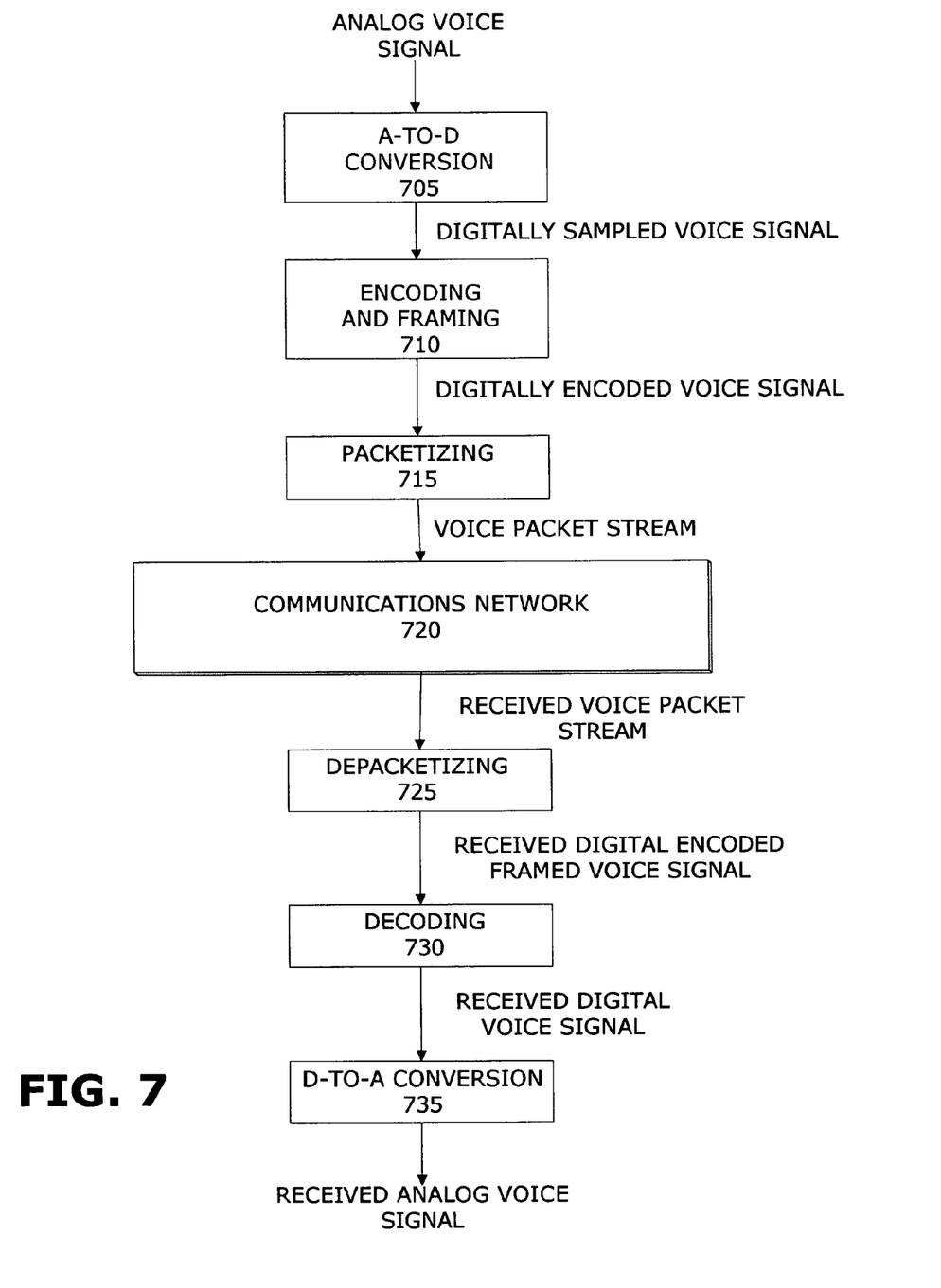
FIG. 7 depicts the steps involved in a typical implementation of a voice-over packet call across a communications network.

FIG. 7 illustrates the analog-to-digital conversion, encoding, framing, packetization, depacketization, decoding, and digital-to-analog conversion steps involved in a typical realization of a voice-over-packet call across a network. As shown in FIG. 7, an analog voice signal is digitized, at step 705, to create a digital sampled voice signal. Next, in step 710, the digitally sampled voice signal is encoded and framed to create a digitally encoded voice signal. At step 715, the digitally encoded voice signal is packetized to create a voice packet stream, which is then transmitted across the communications network (step 720). At the destination end of the network, a received voice packet stream is depacketized, at step 725, to create a received digitally encoded framed voice signal, which is decoded, at step 730, to create a received digital voice signal. The depacketization step may include packet loss concealment methods. Finally, in step 735, the received digital voice signal is converted from digital format back to analog format.

Digitization of the analog voice signal produces a digitally encoded voice signal. Typically, the digitally encoded voice signal comprises 16 or 8 bits per sample and a sampling rate of 8 or 16 KHz. Typical encoding methods include GSM RPE-LTP, G.711, G.723, or G.729. The G.723 and G.729 encoding methods impose a frame (or block) structure on the digital signal. In G.723, for example, there are 192 bits in each frame (corresponding to 30 ms of speech at 6.4 kilobits/second) or 160 bits in each frame (corresponding to 30 ms of speech at 5.3 kilobits/second). In G.729 encoding, there are 80 bits in each voice frame (corresponding to 10 ms of speech at 8 kilobits/second). In G.711 encoding, the encoding operation is done on a per-sample basis (i.e. one sample at a time). Hence, a framing structure is not imposed by G.711. However, the present invention may be applied to G.711 voice signals if a framing structure has been imposed on a G.711 encoded voice signal. Typically, this will be the case if the G.711 encoded voice signal is packetized.

Received frames are typically marked as "bad" if they have been corrupted. Corruption may occur, for example, when there is noise in the network, when packets are lost during transmission, or when there is contention for a multi-access channel in a network. A bad frame is considered by the decoder to be an erasure. A frame may be marked as bad (erased) either by providing an external indicator that the frame is bad, or by setting certain bits in the frame to a certain pattern (e.g. an all-zero frame). In the G.729 decoder, there is a built-in concealment method for reconstructing erased frames. In the G.723 decoder, there is a built-in method for concealing frame erasures. The G.723 decoder switches from regular decoding to a frame erasure concealment mode when an erasure has occurred.

In the case of a circuit-switched (i.e., non-packetized) call, the steps are essentially the same as depicted in FIG. 7, except that the packetization and depacketization steps are omitted.

Figure 8:
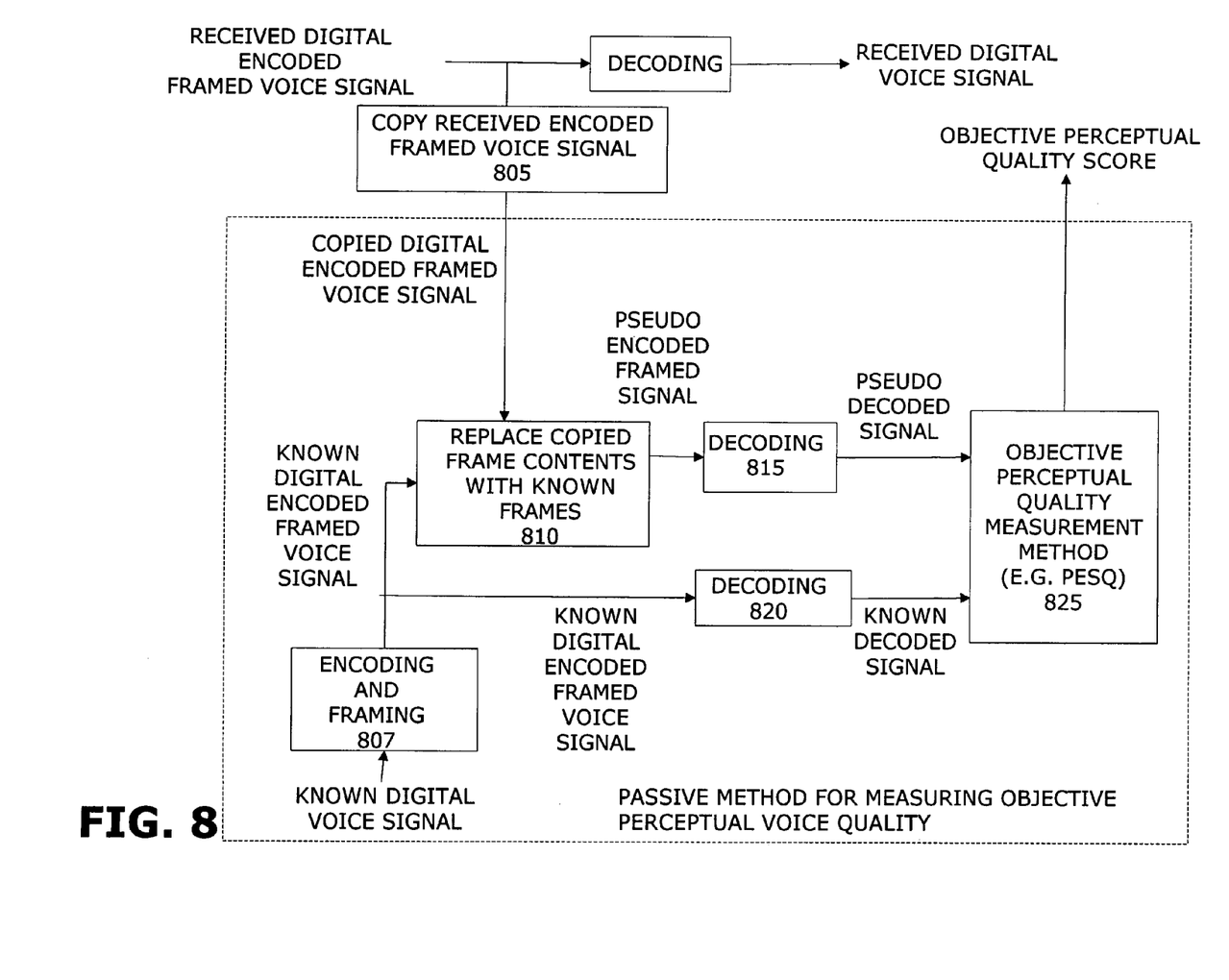
FIG. 8 shows a flow diagram illustrating a passive method for measuring objective perceptual quality of a received voice signal for framed encoded signals in a non-packetized network in accordance with an embodiment of the present invention.

Now consider FIG. 8, which illustrates the method of an embodiment of the present invention as it might be applied to a digitally encoded framed signal at the point just before decoding step shown in FIG. 7. The first step, step 805, is to copy the received encoded framed voice signal. The next step, step 810, is to replace the frame contents of the copied encoded framed signal with the frame contents of a known digitally encoded framed voice signal. As illustrated in step 807 of FIG. 8, the known digitally encoded framed voice signal may be created by encoding and framing a known digital voice signal. The encoding method and framing method used for the known digital voice signal is the same as that used to encode and frame the received voice signal. Note again that the known digital voice signal may be a pre-recorded voice signal, the ASTS™ or a P.50 artificial voice signal. The constructed signal is called the pseudo encoded framed signal. Frames in the received encoded framed signal that are marked as erased (or bad) remain marked as erased in the pseudo encoded framed signal.

The next steps are to decode the pseudo encoded framed signal (step 815), and decode the known encoded framed signal (step 820), using the same decoding algorithm that is used for decoding the received encoded framed signal. This produces the pseudo-decoded signal and the known decoded signal. In step 825, the pseudo decoded signal and the known decoded signal are then presented to an objective perceptual quality measurement method (such as the ITU-T PESQ or PSQM methods) to provide an objective perceptual quality score.

In the embodiment illustrated by FIG. 8, frames in the received signal are copied and the contents of the copied frames are replaced with the contents of the known test signal frames so that the pseudo encoded framed signal delivered to the decoding 15 step will correspond to the received signal in terms of the number and position of lost or erased frames. This being the case, alternative embodiments of the invention may be implemented, not by copying and replacing frames, but by identifying lost or erased frames in the received signal and marking corresponding frames in the known signal as lost or erased. In such an alternative embodiment, it is not necessary to copy or replace frames and frame contents.

The objective perceptive quality score for the pseudo decoded signal corresponds exactly to that which would have been obtained had the objective perceptual quality measurement method been applied directly in an active manner with a known test signal that has been transmitted across the network. This is the case because: (1) the marking of erased frames in the constructed pseudo-encoded framed signal is the same as that in the received encoded framed signal; and (2) the frame erasure process is independent of the actual voice signal that is contained in the transmitted frames. Therefore, the invention provides a method to use objective perceptual measurement algorithms (developed in the context of active measurements) to obtain passive measurements.

Note that one may also wish to compare the quality of the pseudo-decoded signal with the quality of the known digital voice signal (instead of the known decoded voice signal). In this case, one would simply present the known digital voice signal to the objective perceptual quality measurement method instead of the known decoded signal. The decoding of the known digital encoded framed voice signal is then not required.

The measurement method of the present invention may be applied in a repetitive and automated manner to form a passive monitoring system for voice call quality. This is useful for network monitoring purposes and verifying service level agreements (SLAs).

The computational burden of the objective perceptual quality measurement systems described above may be excessive at their intended point of application. For example, suppose that the packetized method described above with reference to FIGS. 2-6 is to be implemented in a device such as an Internet Protocol (IP) mobile or fixed telephone. In this case, the computational requirements of the applied objective perceptual quality measurement system described above may be excessive in relation to the computational processing power that is available in the telephone. Similarly, if the above-described applied objective perceptual quality measurement system is applied at a device such as a packet router or a packet gateway, both of which are designed to process a plurality of packetized media streams, the computational requirements may again be too high for the device due to the multitude of packet streams that have to be monitored and measured. As yet another example, suppose that the method in non-packetized method described above with reference to FIG. 8 is applied in a device such as a conventional cellular telephone, where the voice signal is encoded and framed. In this case, the computational requirements of the above-described applied objective perceptual quality measurement systems may be too high relative to the computational processing power that is available in conventional cellular telephones.

Accordingly, it may be desirable and advantageous to implement the measurement and monitoring methods described above in a client-server arrangement as described below. In a client-server implementation configured to operate in accordance with the present invention, the computational burden of the objective perceptual quality measurements may be moved away from the original intended points of measurement or monitoring, and onto one or more servers. Thus, the passive methods of monitoring and measuring perceptive quality of packetized and non-packetized signals in a communication network of the present invention may still be applied in situations where the devices where the measurements take place lack the available computational processing power.

The client-server implementation also enables applying the passive measurement and monitoring methods of the present invention at points in the communications network where it may simply be undesirable to consume valuable computational processing power at the destination device for the purpose of monitoring and measuring signal quality. It may also be impossible or undesirable to implement objective perceptual quality measurements at the destination device due to, for example, licensing restrictions, hardware costs (e.g., such as the cost of memory), or the additional technical hardware and software requirements such an implementation would impose on the destination device.

Figure 9:
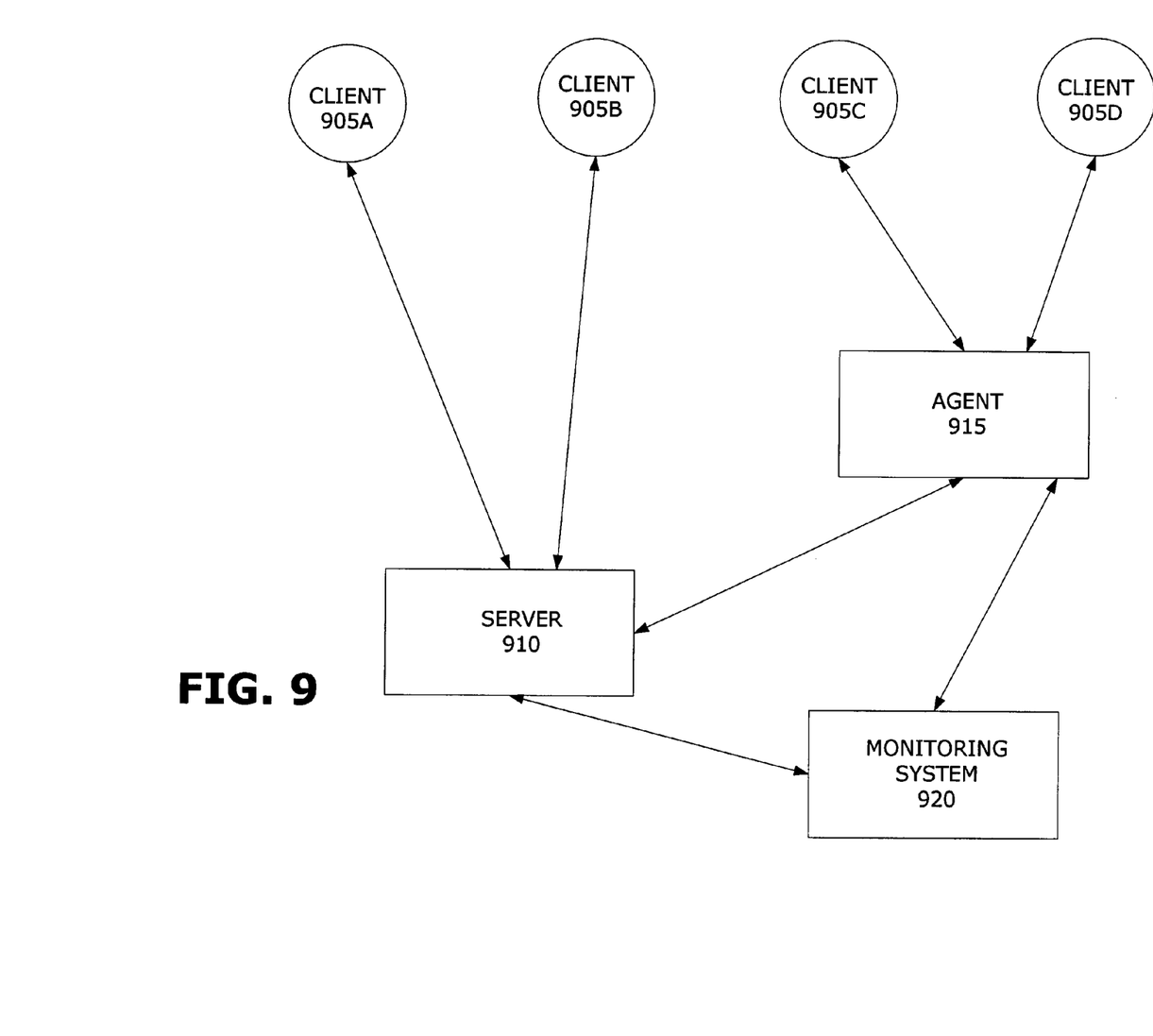
FIG. 9 depicts a client-server implementation of an embodiment of the present invention.

The client-server implementation of the present invention is illustrated in FIG. 9. A client 905A resides at a point in a network where it is desired to obtain a passive measurement of the objective perceptual quality of a media stream or of a framed encoded signal. There may be one client (905A) or many clients (represented in FIG. 9 by 905A, 905B, 905C and 905D) in the system. Examples of points in a network where it may be desired to obtain a passive measurement include: an IP packet router or an ATM cell switch; an IP or ATM gateway; an IP or ATM phone; a network link carrying IP packets or ATM cells; a network link carrying a framed encoded signal; a digital phone that receives a framed encoded voice signal; a wireless or cellular telephone that receives a framed encoded voice signal; a computer that receives a packetized signal or a framed encoded signal; a storage device (e.g. disc; or storage array) that is used to store a packetized media stream or store a framed encoded signal; a measurement device that is connected to the network for testing or troubleshooting purposes; or a monitor or probe that is connected to the network for monitoring or probing purposes.

Clients 905A-905D are coupled through the communications network to a server 910. There may be one or more servers in the client-server implementation of the present invention. There also may be one or more agents in the system, as illustrated by agent 915 in FIG. 9. An agent is a computer or process that serves as an intermediary between the client and the server, as will be described below. There also may be one or more independent monitoring, measurement, or management systems (920) that interface with the server(s) and with the agent(s).

A client-server system configured in accordance with the present invention operates as follows. In the case of the passive method for measuring and monitoring the perceptual quality of a received digitally encoded and framed signal, the client 905A observes an encoded and framed signal for a finite amount of time (or for a finite number of frames) and maintains a record of the frames which are erased or lost. This information is passed to the server 910 (possibly via agent 915) along with additional related information, such as the codec type and the frame size. The server 910 then constructs the pseudo encoded framed signal shown between steps 810 and 815 of FIG. 8, as discussed above. This is done by taking the known digital encoded framed voice signal produced by step 807 in FIG. 8 and marking frames as erased or lost in correspondence with the record of erased or lost frames that was transferred from the client 905A to the server 910. This process is analogous to the method described above with reference to step 810 in FIG. 8, where the copied frame contents are replaced with known frame contents (see FIG. 8). Hence, there is no need to actually transfer any copied frame contents from client 905A to the server 910, which reduces the communication overhead between the clients, agents and servers in the communications network. It should be noted that the record of erased or lost frames that is transferred from a client to a server may be converted to a compressed format before the transfer in order to further reduce the communication overhead between the clients, agents and servers. Compressed records may be decompressed at the server 910. Having received (and possibly decompressed) a record and constructed the pseudo encoded framed signal, the server 910 then applies the passive method for measuring objective perceptual voice quality that is described above.

In the case of the passive method for measuring and monitoring the perceptual quality of a received packetized media stream, the client 905A receives the media stream from the packet-switching network (S110 in FIG. 3). Then, the client 905A copies and timestamps packets (S120 in FIG. 3). Next, the client 905A separates the stored media packets by source (S140 in FIG. 3) and determines the encoding/decoding method used for each source (S150 in FIG. 3). The client 905A then determines the packetization/depacketization method used for each source (S160 in FIG. 3). The client 905A determines and records for each source the packets which have been lost or discarded by examining the sequence numbers in the packets from each source. The client 905A then transfers a record of all of this information (i.e. for each source: the timestamps, the encoding and decoding methods, the packetization and depacketization methods, the list of packet sequence numbers for packets that have been lost or discarded, and other related information that may be required) to the server 910 (possibly via agent 915).

The record transferred to the server 910 may be compressed by the client 905A prior to transfer. Using the information in the transferred record, the server 910 simulates the encoding and packetization of the known media signal (S170 in FIG. 3). The server 910 then prepares a pseudo-media packet stream using the information in the record that specifies which packets have been lost or discarded (i.e. packets observed by the client to be lost or discarded or considered to be lost or discarded in the pseudo-media packet stream constructed by the server). Next, the server 910 simulates the arrival of the pseudo-media packets (S190 in FIG. 3). Then the server 910 depacketizes and decodes the pseudo-media packet stream (S200 in FIG. 3), and determines the objective quality value of the pseudo-media signal (using e.g., PESQ) (S210 in FIG. 3). Finally, the server 910 maps the objective quality value to a perceptual score, such as the mean-opinion-score (MOS) (S220 in FIG. 3). Note that the process of constructing the pseudo-media packet stream is analogous to the method described above with reference to FIG. 3, where one replaces copied media packet payloads with known media signal packet payloads (S180 in FIG. 3). Hence, there is no need to actually transfer copied packet payloads from a client 905A to the server 910.

The above described passive system possesses a number of inherent advantages relative to an active system of measuring the perceptual quality of media streams. First, the passive method can be used anywhere on the network to measure the perceptual quality of live real-time media streams that are in the process of being transmitted across the network. The active method can only be used to measure the perceptual quality of test media streams that are injected into the network. Second, the passive method can be used to measure simultaneously the perceptual quality of multiple live real-time media streams since the copied packet stream may contain multiple media streams that can be distinguished by their source.

Third, the passive method does not require any sending device. The active method requires a sending device for inserting a packetized test signal into the network. Fourth, the passive method may be used to measure simultaneously, in one test, the perceptual quality of a media stream using more than one perceptual quality measurement technique. This is because the passive method does not require the transmission of a test signal and is not restricted to any specific perceptual quality measurement technique. Fifth, the passive method may be used to measure simultaneously the perceptual quality of a media stream using more than one known media signal. This is because the passive method does not require the transmission of a test signal and is not restricted to any specific known media signal 46. In the active method, different known media signals would have to be transmitted separately to obtain perceptual quality measurements for each different known media signals.

Sixth, the passive method may be used to measure simultaneously the perceptual quality of a media stream using more than one perceptual quality measurement technique and more than one known media signal. This is because it is possible to simultaneously use more than one perceptual quality measurement technique and, for each such technique, utilize more than one known media signal. Seventh, the passive method is not restricted to any particular media type (e.g. voice, video, audio, or combinations thereof (multimedia), since no assumptions are made regarding the form of the media signal. Eighth, the passive method may be repeated periodically in time under automatic control to enable the continuous monitoring of the perceptual quality of media streams.

The above described advantages of the passive systems are by no means meant to limit the scope of the invention. Though the invention has been described with respect to preferred embodiments thereof, many variations and modifications will become apparent to those skilled in the art upon reading this disclosure and the following claims, as well as practicing the claimed invention. It is therefore the intention that the claims be interpreted as broadly as possible in view of the prior art, to include all such variations and modifications.

What is claimed is:

1. A method for determining perceptual quality of a received encoded framed signal, comprising the following steps:

copying said received encoded framed signal to obtain a copied encoded framed signal;

determining a framing technique used for framing said received encoded framed signal;

determining an encoding technique used for encoding said received encoded framed signal;

encoding a known media signal with said encoding technique used for encoding said received encoded framed signal to produce a known encoded signal;

framing said known encoded signal with said framing technique used for framing said received encoded framed signal to produce a known encoded framed signal;

replacing content of said copied encoded framed signal with content of said known encoded framed signal to produce a pseudo-encoded framed signal;

determining a perceptual quality of said pseudo-encoded framed signal; and using said perceptual quality of said pseudo-encoded framed signal to generate a perceptual quality of said received encoded framed signal.

2. The method of claim 1, further comprising the step of marking a frame in said copied encoded framed signal as corrupt in correspondence with a designated corrupt frame in said received framed encoded signal.

3. The method of claim 1, further comprising the step of decoding said pseudo-encoded framed signal with a decoding algorithm used for decoding said received encoded framed signal to produce a pseudo-decoded signal and a known decoded framed signal.

4. The method of claim 3, wherein the step of determining the perceptual quality of said pseudo-encoded framed signal comprises presenting said pseudo-decoded signal and said known decoded signal to an objective perceptual quality measurement tool.

5. The method of claim 1, wherein said known encoded framed signal comprises a pre-recorded voice signal.

6. The method of claim 1, wherein said known encoded framed signal comprises an artificial voice signal.

7. The method of claim 1, wherein said known encoded framed signal comprises a proprietary signal exhibiting natural speech characteristics.

8. The method of claim 1, further comprising the steps of:
identifying a frame in said received encoded framed signal that has been corrupted to produce a record of corrupted frames; and
transmitting said record to a server.

9. The method of claim 8, further comprising the step of transmitting a codec type to said server.

10. The method of claim 8, further comprising the step of transmitting a frame size to said server.

11. The method of claim 8, further comprising the step of converting said record to a compressed format prior to said step of transmitting said record to said server.

12. A system for determining perceptual quality of a received encoded framed signal, comprising:
means for copying said received encoded framed signal to obtain a copied encoded framed signal;
means for determining a framing technique used for framing said received encoded framed signal;
means for determining an encoding technique used for encoding said received encoded framed signal;
means for encoding a known media signal with said encoding technique used for encoding said received encoded framed signal to produce a known encoded signal;
means for framing said known encoded signal with said framing technique used for framing said received encoded framed signal to produce a known encoded framed signal;
means for replacing content of said copied encoded framed signal with content of said known encoded framed signal to produce a pseudo-encoded framed signal;
means for determining a perceptual quality of said pseudo-encoded framed signal; and
means for generating a perceptual quality of said received encoded framed signal based on said perceptual quality of said pseudo-encoded framed signal.

13. The system of claim 12, further comprising means for marking a frame in said copied encoded framed signal as corrupt in correspondence with a designated corrupt frame in said received framed encoded signal.

14. The system of claim 12, further comprising means for decoding said pseudo-encoded framed signal with a decoding algorithm used for decoding said received encoded framed signal to produce a pseudo-decoded signal and a known decoded framed signal.

15. The system of claim 12, wherein said means for determining the perceptual quality of said pseudo-encoded framed signal comprises an objective perceptual quality measurement tool.

16. The system of claim 12, wherein said known encoded framed signal comprises a pre-recorded voice signal.

17. The system of claim 12, wherein said known encoded framed signal comprises an artificial voice signal.

18. The system of claim 12, wherein said known encoded framed signal comprises a proprietary signal exhibiting natural speech characteristics.

19. The system of claim 12, further comprising:
means for identifying a frame in said received encoded framed signal that has been corrupted to produce a record of corrupted frames; and
means for transmitting said record to a server.

20. The system of claim 19, further comprising means for transmitting a codec type to said server.

21. The system of claim 19, further comprising means for transmitting a frame size to said server.

22. The system of claim 19, further comprising means for converting said record to a compressed format.

23. A method for determining perceptual quality of a received encoded framed signal, comprising the following steps:
copying said received encoded framed signal to obtain a copied encoded framed signal;
replacing content of said copied encoded framed signal with content of a known encoded framed signal to produce a pseudo-encoded framed signal;
determining a perceptual quality of said pseudo-encoded framed signal;
using said perceptual quality of said pseudo-encoded framed signal to generate a perceptual quality of said received encoded framed signal;
identifying one or more corrupt frames in said received encoded framed signal to obtain a record of corrupt frames; and
marking a set of frames in a known encoded framed signal in accordance with said record of corrupt frames to produce said pseudo-encoded framed signal.

24. The method of claim 23, further comprising the step of encoding said known encoded framed signal with an encoding technique used for encoding said received encoded framed signal.

25. The method of claim 23, further comprising the step of framing said known encoded framed signal with a framing technique used for framing said received encoded framed signal.

26. The method of claim 23, further comprising the step of marking a frame in said copied encoded framed signal as corrupt in correspondence with a designated corrupt frame in said received encoded framed signal.

27. The method of claim 23, further comprising the step of decoding said pseudo-encoded framed signal with a decoding algorithm used for decoding said received encoded framed signal to produce a pseudo-decoded signal and a known decoded framed signal.

28. The method of claim 27, wherein the step of determining the perceptual quality of said pseudo-encoded framed signal comprises presenting said pseudo-decoded signal and said known decoded signal to an objective perceptual quality measurement tool.

29. The method of claim 23, wherein said known encoded framed signal comprises a pre-recorded voice signal.

30. The method of claim 23, wherein said known encoded framed signal comprises an artificial voice signal.

31. The method of claim 23, wherein said known encoded framed signal comprises a proprietary signal exhibiting natural speech characteristics.

32. The of claim 23, further comprising the steps of:
identifying a frame in said received encoded framed signal that has been corrupted to produce a record of corrupted frames; and
transmitting said record to a server.

33. The of claim 32, further comprising the step of transmitting a codec type to said server.

34. The of claim 32, further comprising the step of transmitting a frame size to said server.

35. The of claim 32, further comprising the step of converting said record to a compressed format prior to said step of transmitting said record to said server.

36. The system of claim 12, further comprising:
means for identifying one or more corrupt frames in said received encoded framed signal to obtain a record of corrupt frames; and
means for marking a set of frames in a known encoded framed signal in accordance with said record of corrupt frames to produce said pseudo-encoded framed signal.

* * * * *